United States Patent
Sher et al.

(10) Patent No.: US 7,013,933 B2
(45) Date of Patent: Mar. 21, 2006

(54) METHOD AND DEVICE FOR DISPENSING FROM LIQUID CONCENTRATES BEVERAGES HAVING MULTI-LAYER VISUAL APPEARANCE

(75) Inventors: Alexander A. Sher, Danbury, CT (US); Raffaella Saggin, New Milford, CT (US); Kenneth R. Moffitt, Brookfield, CT (US); Beli R. Thakur, New Milford, CT (US); Simon J. Livings, New Milford, CT (US); Elaine R. Wedral, Sherman, CT (US)

(73) Assignee: Nestec S.A., Vevey (CH)

( * ) Notice: Subject to any disclaimer, the term of this patent is extended or adjusted under 35 U.S.C. 154(b) by 229 days.

(21) Appl. No.: 10/695,993

(22) Filed: Oct. 30, 2003

(65) Prior Publication Data

US 2005/0095341 A1  May 5, 2005

(51) Int. Cl.
*B65B 1/04* (2006.01)

(52) U.S. Cl. ............ 141/99; 222/129.1; 141/100; 99/299; 99/309

(58) Field of Classification Search ............ 141/9, 141/100, 2, 18, 104, 392, 367; 222/129, 129.1; 99/299, 323, 306, 305, 309
See application file for complete search history.

(56) References Cited

U.S. PATENT DOCUMENTS

| 2,740,571 A | * | 4/1956 | Busto | 141/94 |
| 5,163,488 A | * | 11/1992 | Basch | 141/100 |
| 6,220,147 B1 | | 4/2001 | Priley | 99/323 |

FOREIGN PATENT DOCUMENTS

BE  899988  10/1984

* cited by examiner

*Primary Examiner*—Steven O. Douglas
(74) *Attorney, Agent, or Firm*—Bell, Boyd & Lloyd LLC

(57) ABSTRACT

The invention relates to a method for dispensing a beverage with the visual appearance of multi-layers obtained from dilution of concentrates in proper dilution ratios. A first liquid layer is first delivered with a controlled density. A second liquid layer is diluted to a density that is lower than the density of the first liquid layer so that the first and second layers form a stable layered arrangement with the second liquid layer of lower density remaining spatially above the first liquid layer to provide a visually distinct layer as compared to the first liquid layer in the container. The invention also relates to a dispensing device and to a machine readable program enabling the device to deliver the multi-layer appearance beverage according to the method of the invention.

22 Claims, 8 Drawing Sheets

METHOD AND DEVICE FOR DISPENSING FROM LIQUID CONCENTRATES BEVERAGES HAVING MULTI-LAYER VISUAL APPEARANCE

FIELD OF THE INVENTION

The invention relates to the convenient dispensing of hot or cold beverages providing the visual appearance of multi-layers of liquids in the serving container. The invention more particularly relates to the dispensing of beverages reconstituted from liquid concentrates through an automated dispensing device.

BACKGROUND OF THE INVENTION

Cappuccino type beverages exist which are formed of coffee topped with foamed milk. These beverages are relatively easy to produce in automatic dispensers by first foaming the milk and delivering the foam in the cup, then, providing the coffee liquid through the foam.

Layered Cappuccino type beverages, are more complex coffee specialties which can be found in coffee houses and mid to upscale restaurants. A typical beverage called "Latte Macchiato", consists of two distinct layers of milk and espresso coffee topped with milk foam. Other recipes that can be found are "White Mocha" beverages made of a bottom layer of white chocolate with a top layer of espresso coffee or cocoa/coffee based beverages with a bottom layer of hot chocolate, espresso coffee intermediate layer and milk foam on top. Since all these beverages provide visual appeal to the consumers, they are generally served in transparent containers such as a glass. They are usually consumed in two ways; either by stirring the product, for example when sugar is added, or by drinking the beverage layer by layer.

The preparation of layered Cappuccino type beverages and the like is typically executed manually and, therefore, requires skilled personnel and very careful attention for proper preparation. Furthermore, the preparation is time consuming and requires more labor than for serving usual coffee or milk beverages. Furthermore, because of the by hand preparation, the consistency of the final product may vary from product to product and from operator to operator depending upon his/her skills and available preparation time. When preparing the so-called Lattee Macchiato or layered Cappuccino, the milk foam and espresso coffee are prepared separately. The glass is first filled with hot foamed milk. Some time is allowed to stabilize the foam, and finally espresso is slowly poured over the milk and foam, creating a layered effect as viewed through the serving glass. To reduce the preparation time and allow consumers to drink layered beverages at home or in the office, some automation has been introduced in coffee machines, but these do not provide truly automatic dispensing and some manual preparation or cleaning is required.

U.S. Pat. No. 6,220,147 entitled "Beverage preparation and layering device for an espresso machine" describes a layering tool, attached to the outlet tube adjacent to the lower end, to create a layered drink of two distinct substances. The layering device consists of a concave spoon attachment for an espresso machine. The spoon simulates the manual preparation of layered beverages. The spoon gently pours the second liquid on top of the first component to form a distinct layer. The concave tube attachment can be located within a beverage container with the spoon at the approximate layer of the first layer beverage. A disadvantage of this layering method is that it requires assembly prior to preparation of layered beverages and manual use by operators. Further, the device needs to be cleaned after dispensing because of contact with the beverages and should be removed whenever a non-layered beverage has to be delivered.

Another layering tool for pouring liquids as non-mixed layers is described in the Belgian patent BE 899988 (Herbots, 1984). The device consists of a dispensing opening connected to a float, vertically movable along it. The float has the shape of a platform so it can receive the downward fluid gently spreading the liquid on the respective surface levels. This device can work for cocktails, Irish coffee or other liquids with small differences in density. A disadvantage of this layering tool is that it also requires assembly prior to preparation of layered beverages and manual use by operators. Further, this device is not part of a coffee machine, and should manually be used when dispensing a layered drink.

Macco S.p.A., Franke Kaffeemachinen A G and Palux are currently manufacturing coffee machines that dispense various products including a layered beverage (Latte Macchiato) from coffee beans and refrigerated fresh milk. In the Bremer coffee machine, hot milk is first dispensed, followed by milk foam. Finally, steam-extracted coffee from fresh-ground beans is dispensed on top of the beverage. The delivery rate is 2.1 g/s.

A disadvantage of this method is that it takes relatively long time to dispense a layered beverage and it requires refrigerated milk. The method used in these coffee machines could not be used to prepare layered beverages from liquid concentrates because steam vapor is implemented to extract the coffee creating a liquid with density lower than diluted coffee concentrate. Further, the steam venturi system would not work with dense and viscous concentrates.

Therefore, there is no method and device existing for dispensing of layered beverages which are fast, convenient, automated and reproducible. The present invention now provides such a new method and device to generate both hot and cold layered beverages.

SUMMARY OF THE INVENTION

The invention relates to a method for dispensing a layered beverage from at least a first and second liquid concentrates which are diluted and mixed with water and delivered without any external mechanical layering tools (e.g., no concave spoon, float or similar) to provide visually distinctive and stable layers in a serving container.

The method more particularly comprises the step of providing at least a source of first liquid concentrate and at least a source of second liquid concentrate; pumping a metered amount of the first liquid concentrate and delivering a first liquid layer into the container pumping a metered amount of the second liquid concentrate from the source, mixing it with a metered amount of water to form a second, diluted liquid layer from the second concentrate, and delivering the diluted second concentrate into the container and first liquid layer to form a second liquid layer; delivering the second liquid layer after the first liquid layer in the container. The liquid concentrates are pumped into at least a mixing chamber and mixed with respective metered amounts of water in the mixing chamber. The second liquid layer is diluted to a density that is lower than that of the first liquid layer so that the first and second layers form a stable layered arrangement in the container with the second, diluted liquid layer of lower density remaining spatially above the first liquid layer to provide a beverage having a visually distinct upper layer upon a lower layer in the container.

Preferably, the first liquid layer is obtained by mixing a metered amount of first concentrate with a metered amount of water. Preferably, the density variation between the first and second liquid layers is set by controlling the concentrate-to-water dilution ratio of the first liquid layer with respect to the concentrate-to-water dilution ratio of the second liquid layer. More particularly, the difference of density between the first and second layers must be of at least 0.1% to create visually distinct layers.

The delivery flow for creating the first and second liquid layers is advantageoulsy carried out at relatively slow linear velocity to reduce turbulence. For a container size of between 50 and 500 ml, the delivery flow has a linear velocity of no more than 120 cm/s. Importantly, the water flow rate and concentrate flow rate are also relatively low. The water flow rate does not exceed 20 mL/s. The concentrate flow rate also does not exceed 20 mL/s, even preferably, does not exceed 10 mL/s.

Preferably, a pause is allowed between the pumping of the first concentrate and the pumping of the second concentrate. A pause minimizes the liquid motion to prevent mixing of layers due to diffusion and convection of the liquids. During the pause, water may continue to be delivered to ensure proper dilution ratio of the first concentrate to create the first layer, or may be stopped if the proper dilution is achieved, then, be re-started only when the second concentrate is pumped to deliver the second layer and until the proper dilution ratio of the second concentrate is completed to create the second distinct layer.

Preferably, during or after delivering the first liquid layer, a metered portion of concentrate is mixed with water and further whipped to deliver foam directly onto the first liquid layer so as to slow down the velocity of the second liquid layer when it is delivered in the container. Whipping is preferably carried out by a high speed whipping means before being delivered.

The present invention also relates to a dispensing device for automatically dispensing a beverage with the distinctive visual appearance of multi-layers in a serving container. The dispensing device comprises at least one mixing means; a water supply and a water transport and metering means to transport and meter water to the mixing means. The dispensing device further comprises at least first and second liquid concentrates individually contained in storage means; concentrate lines and transport and metering means configured to transport and meter each concentrate individually from the storage means to the mixing means; and at least one delivery line with an outlet to discharge amounts of the mixed and diluted concentrates in a serving container.

Control means are also provided which include user input means and a controller that selectively control the activation of the pumps according to a programmed cycle corresponding to a user's selection input on the user input means. The control means selectively activate the water and concentrate transport and metering means for the mixing and discharge of a metered amount of a first concentrate with a metered amount of water to form a first liquid layer and, subsequently the mixing and discharge of a metered amount of a second concentrate with a metered amount of water to form a second liquid layer. The concentrate-to-water dilution rates of the first and second layers are controlled one relative to the other to adjust the density of the first discharged liquid layer higher than the density of the second discharged liquid layer so as to form a stable layered arrangement with the first liquid layer remaining spatially lower than the second liquid layer and visually distinct from the second liquid layer in the container.

Preferably, the device further comprises a whipper which is activated on by the control means to foam a metered amount of concentrate during or after the first liquid layer is delivered and before the discharge of the second liquid layer is delivered. The whipper's activation is able to produce foam at the surface of the first layer which slows down the velocity of the second layer in the container before coming in contact with the first liquid layer.

In an alternative, the whipper can also form the foam at the end of the dispensing cycle after the liquid layers have been delivered in the container.

In another aspect of the invention, a machine readable program is provided that contains instructions for controlling a dispensing device to dispense a beverage with the distinctive appearance of multi-layers in a serving containers, wherein the dispensing device comprises at least one mixing means, a water supply and a water delivery means to control the flow delivery of water, at least a first and second liquid concentrates individually contained in storage means, concentrate delivery means to control the flow delivery of the concentrate, at least one delivery line with an outlet to discharge amounts of the mixed and diluted concentrates in the serving container and programmable control means including a user input means.

The machine readable program is installable on a processor or microprocessor and comprises:

means for receiving a beverage selection entered by the user through user input means, means for actuating a water delivery means at at least one programmed water flow rate and during at least one programmed water time sequence, means for actuating a first concentrate delivery means at a programmed first concentrate flow rate and at a programmed first concentrate delivery time, wherein the water flow rate, water providing time sequence, first concentrate flow rate and first concentrate delivery time are parameters which are adjusted in relation together to deliver a first diluted liquid layer from the first concentrate into the container at a predetermined first concentrate-to-water dilution ratio, means for actuating a second concentrate delivery means at a second concentrate flow rate and at a programmed second concentrate delivery time, wherein the water flow rate, water time sequence, second concentrate flow rate and second concentrate delivery time are parameters which are adjusted in relation together to deliver a second diluted liquid layer from the second concentrate into the container at a predetermined second concentrate-to-water dilution ratio, and means for providing the first and second dilution ratios at predetermined values so that the resulting density of the first liquid layer is higher than the resulting density of the second liquid layer.

The machine readable program further comprises means for accessing a timer in signal communication with the processor and means for actuating the water delivery means according to the programmed water time sequence and for actuating the concentrate delivery means according to the programmed first and second concentrate delivery times in order to deliver the first and second layers at the predetermined first and second concentrate-to-water dilution ratios.

The machine readable program further comprises means for actuating a whipper at a predetermined whipping speed for whipping an amount of the first and/or second concentrate and enabling the delivery of a foamed layer.

The water delivery means may be a peristaltic pump, or simply the combination of tap pressure or gravity and a valve. The concentrate delivery means are preferably transport and dosing means such as peristaltic pumps.

DETAILED DESCRIPTION OF THE PREFERRED EMBODIMENTS

Figure 1:
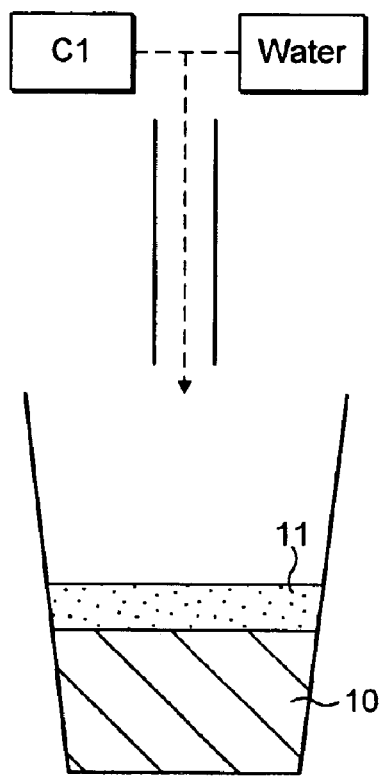
FIGS. 1 to 3 are schematic views showing the steps for the delivery of a foamy two-layer liquid beverage obtained from two concentrates.

The present invention relates to a new method for delivering automatically and conveniently a multi-layered beverage through a dispensing device where amounts of at least a first and second concentrates are metered from concentrate storage means wherein at least the second liquid concentrate is properly mixed with a diluent, preferably cold or hot water, to be subsequently discharged in a serving container. The metered amount of second concentrate is diluted with water in such a manner that the resulting density of the liquid layer, as obtained from the mixture of second concentrate and water is less dense than the first liquid layer as obtained from the metered amount of first concentrate. This accurate control of relative densities between the layers of liquids including proper controlled dilution with water enables to build a stable layered arrangement within the container.

The liquid concentrates can be transported and metered by transport and metering means such as pumping means or the combination of gravity effect and a control valve. Pumping means are preferred to transport viscous concentrates. Pumping means can be peristaltic pumps or any other types of pumps whose pumping rates can be precisely controlled.

Stability of the multi-layer configured beverage is found when at least two liquid layers are visually apparent through a transparent container, such as a glass, over a period of time of more than two minutes, preferably more than five minutes, most preferably more than 10 minutes.

Preferably, the first liquid layer is also obtained by mixing the metered amount of first concentrate with a metered amount of water. Consequently, the density difference between the first and second liquid layers can be set by controlling the concentrate-to-water dilution ratio of the first liquid layer with respect to the concentrate-to-water dilution ratio of the second liquid layer.

The initial density of the concentrates can be very variable depending upon the type of product delivered, e.g., coffee, cocoa, milk or others. However, by adjusting the final density of the at least two liquid layers in respect of the desired relative positioning of the layers in the container, i.e., with the higher density layer being discharged before the lower density layer as aforementioned, it has been surprisingly found that it was possible to achieve the preparation of a large variety of stable multi-layer beverages.

The "concentrate-to-water dilution ratio" refers to the formula:

(Flow rate of concentrate multiplied by concentrate delivery time) divided by (Flow rate of water multiplied by water delivery time).

The time for water delivery may exceed the time for the delivery of the concentrate, in particular, to reduce excessive flow rates and linear velocities but also for preventing cross-contamination of a second concentrate by a first concentrate. For a first concentrate, the water delivery time is the period measured from the starting time of water dispensing to the time water is stopped or, at the latest, until the time the next concentrate starts to be dispensed when water is not stopped before. For a second concentrate, the water time delivery is the period measured from the start of the second concentrate delivery to the time the water stops or, at the latest, until a next concentrate starts to be dispensed when water is not stopped before.

The control of the concentrate-to-water dilution ratio enables to modify the initial density of the concentrates and, consequently, to adjust the density of the liquid layers which are delivered in the container so that a difference of density is created between the two layers of liquids, which is sufficient to maintain the layers spatially distinct in the container. The concentrate-to-water dilution ratio effects the density of the liquids by increasing the dilution of the solids but also effects the temperature of the resulting liquids.

Typically, aqueous concentrates are denser than water since they contain a certain amount of solids in addition to water. Therefore, the more water added to the concentrates, the lower the density. Similarly, the dilution of the concentrates with hot or cold water also modifies the density of the resulting liquids. The liquid layers can be delivered at different temperatures which so effect their density accordingly. Typically, the hotter the liquid is made by hot water addition to colder concentrate, e.g., an ambient or chilled concentrate, the lower the resulting density. The temperature of the layers can be adjusted by controlling the dilution rate of cold or ambient concentrates with heated water; with the temperature of water remaining the same for mixing with the at least first and second concentrates or, alternatively, the water temperature being also set at different values according to the layer to be discharged.

Therefore, it has been found that the density variation between at least the first and second layers is important to create stable and distinct layers. More particularly, the density variation between the first and second liquid layers in the container is preferably controlled to be equal to or higher than 0.1%. Density variation lower than 0.1% led to the destruction of the layers after a few seconds.

Even preferably, the density variation between the first and second liquid layers in the container is controlled to be comprised between 0.1 and 40%, more preferably from 0.5 to 10%, most preferably from 1 to 4%. Density variation above 40% usually results in undesirable texture and/or flavors.

The density variation between a first layer of density d1 and a second layer of density d2 is obtained by the formula: $(d1-d2).100/d2$.

In a preferred example, the first concentrate is a milk based concentrate and the second concentrate is a coffee based concentrate. Coffee based concentrate is typically denser than milk based concentrate, since it contains much more total solids, therefore, this requires to adjust the dilution ratio of concentrate to water, for diluting the coffee based concentrate, comparatively lower than the flow ratio of concentrate to water for diluting the milk based concentrate.

The milk based concentrate has preferably between 15 to 33 wt. % total solids and a specific gravity of between 1.01 to 1.15 g/mL.

The coffee based concentrate has preferably between 45 to 65 wt. % total solids, even more preferably between 50 to 55 wt. % and a specific gravity of between 1.05 to 1.28 g/mL.

Based on in-cup quality of layers, the dilution ratio of milk concentrate to water should not exceed 1:3, preferably between 1:0.5 to 1:2.8, while the ratio of coffee concentrate to water should not be lower than 1:5, preferably between 1:6 to 1:20. Excellent results with sharp distinct layers have been obtained (with a coffee layer on top of a milk layer) with a ratio of milk concentrate to water of 1:2.5 and a ratio of coffee concentrate to water of 1:8, wherein milk concentrate had 30 wt. % total solids and coffee concentrate had 55 wt. % total solids.

In another example, the first concentrate is a milk based concentrate and the second concentrate is a cocoa based concentrate.

The cocoa based concentrate has preferably between 65 to 80 total solids and density of between 1.20 to 1.38 g/mL. Excellent results with sharp distinct layers have been obtained (with a cocoa layer on top of a milk layer) with a ratio of milk concentrate to water of 1:2.5 and a ratio of chocolate concentrate to water of between 1:10 and 1:32, preferably 1:15, wherein milk concentrate had 30 wt. % total solids and cocoa concentrate had 72 wt. % total solids.

Importantly, the first and second liquid layers are delivered in a gentle manner without significant turbulence in the container. Minimizing turbulence when delivering the liquid layers is important to create and maintain distinct layers. This can be controlled primarily by maintaining relatively low flow rates and low linear velocity of the diluted concentrate out of the dispensing device. This can also be further controlled by adjusting the delivery temperatures to produce a temperature gradient. The concentrate and dilution water for the first and second liquid layers form concentrate-to-water dilution ratios that also can be adjusted relative to each other to provide a temperature difference between the first and second layers in the container of at least 5% with the second layer having a higher temperature than the first layer.

It is important to control the flow rate properly since it is used to dilute the concentrates and adjust the layers' density. Preferably, water flow rate should be maintained between 1 to 20 mL/s, preferably 5 to 20 mL/s. It was found that a water flow rate greater than 20 mL/s destroys the layers. A water flow rate between 5 to 10 mL/s allows to create distinct and stable layers. Edges of the layers become sharper by decreasing the flow rate to less than 5 mL/s but this compromises the delivery time which becomes too long.

The concentrate flow rate is also maintained below 20 mL/s, preferably within a range of between 0.1 to 10 mL/s, most preferably between 0.5 to 5 mL/s.

The total delivery time should preferably maintained under 60 seconds, most preferably under 45 seconds. The delivery time refers to the total cycle time from the push of a button to the time the beverage is dispensed in the container.

In order to create layers of visually distinctive appearance and stability, the flow linear velocity, when delivering the liquid layers, must be controlled to not exceed 120 cm/s for a container size of 50 to 500 ml. Too high of a velocity tends to create too much turbulence in the container. The flow linear velocity refers to the velocity of the flow of liquid, e.g., the flow of diluted concentrate or pure water, which exits from the outlet or nozzle of the dispensing device.

Preferably, the flow linear velocity should be within a range of 30 to 120 cm/s, most preferably 50 to 100 cm/s. Flow linear velocities below 30 cm/s also compromise total delivery time which thus may exceed 60 seconds. At flow linear velocity higher than 120 cm/s, the layers are destroyed in the container and liquid layers mix together rapidly. At flow linear velocity of between 100 to 120 cm/s to deliver a first layer, a pausing time is preferably required before delivering the second layer in order to have the bubbles sufficiently collapse in the container. Pausing time is preferably of 2 to 25 seconds, preferably 5 to 10 seconds. Pausing time refers to the time left between two concentrate delivery cycles.

The thickness of the layers can be modified according to consumer's preferences. The thickness ratio between liquid layers could be from 9:1 to 1:9. This flexibility can be achieved by varying the dosing settings, i.e., flow rates and dosing times.

Temperature gradient is also important to set clear density variation between the layers. Lower temperature reduces turbulence and diffusion and therefore, contributes to stabilize the layers. Therefore, layers temperatures are more critical for hot beverages and, therefore, require a higher temperature gradient. The layers temperatures can be controlled by the dilution ratio and combination of concentrate with hot, cold and/or ambient water. Temperature gradients between a first layer and a second layer of at least 10% are preferred, with the lower layer being colder than the upper layer. A temperature gradient is optimally between 20 and 35% with the lower layer being the colder layer as compared to the upper layer.

In an important aspect of the invention, a layer of foam is created which helps significantly reduce the flow linear velocity of the second diluted concentrate which forms the second layer on top of the first layer.

For this, during or after delivering the first liquid layer 10, as shown in FIG. 1, but preferably just before delivering the second liquid layer 12 of lower density in the container, a metered portion of concentrate is mixed with water and further whipped to deliver a foam 11 on the first liquid layer. The foam acts to slow down the velocity of the second liquid layer 12, which is delivered in the container.

As a consequence, the delivery time can also be significantly decreased since the second liquid layer can be delivered at a higher flow rate than if no foam layer would be formed and without risking to mix up with the first liquid layer.

Figure 2:
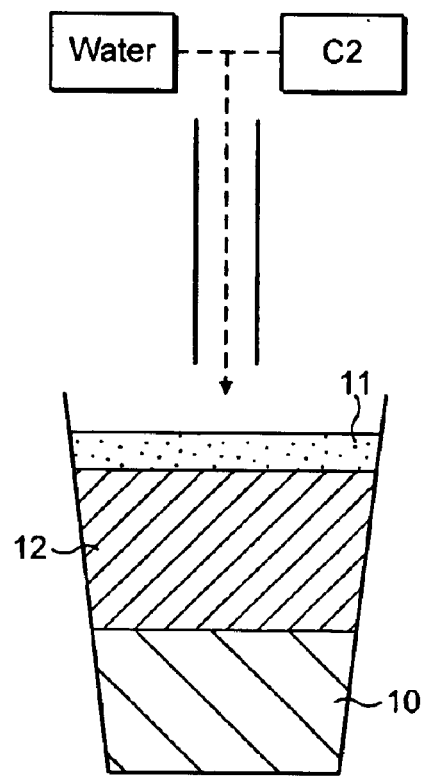
Figure 3:
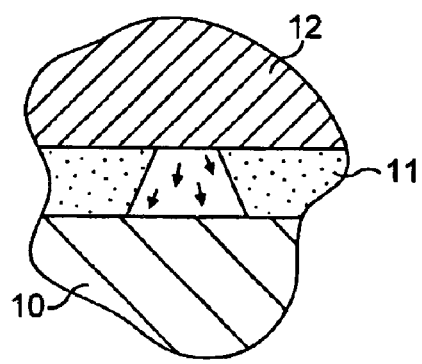

As shown in FIG. 3, at the time the second liquid layer 12 is delivered in the container, the foam 11, that has been created on the top of the higher density layer 10, acts to reduce the velocity of the second liquid layer 12. Therefore, the subsequent lower density layer 12 traverses and diffuses through the layer of foam 11 while its velocity gradually decreasing as it touches the surface of the bottom liquid layer 10. Turbulence is thus avoided between the two liquid layers 10, 12 which, in conjunction with the density gradient, and preferably temperature gradients, between the layers, enable to finally form distinct and stable liquid/liquid non-mixed phases 10–12 as apparent in FIG. 2.

Preferably, the layer of foam is obtained by whipping an amount of first concentrate to form a layer of foam which is delivered onto the first liquid layer. Then, after delivering of the second liquid layer, the layer of foam of very low density compared to the density of the two other layers of liquids is pushed to the surface of the container by the second layer, with comparatively higher density, so to create the foamy surface of the beverage. The amount of first concentrate which is whipped depends upon the volume of foam which is required for the beverage.

A layer of foam could also be obtained by whipping an amount of concentrate, e.g., milk concentrate, with a portion of water at the end of the beverage delivery. However, this layer of foam would not provide the benefit of reducing the velocity of a liquid layer when dispensing the liquid layer there through.

Figure 4:
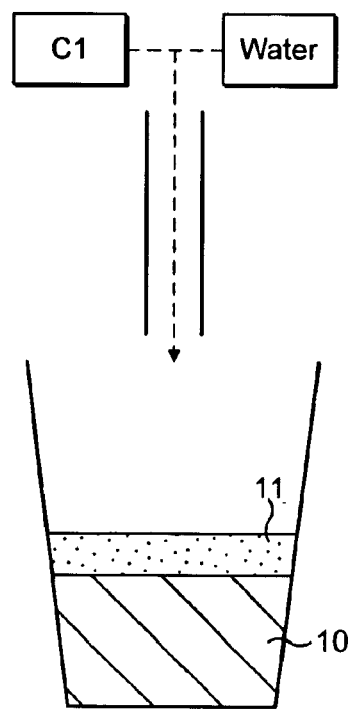
FIGS. 4 to 6 are schematic views showing the steps for the delivery of a foamy multi-layered liquid beverage obtained from three concentrates.
Figure 5:
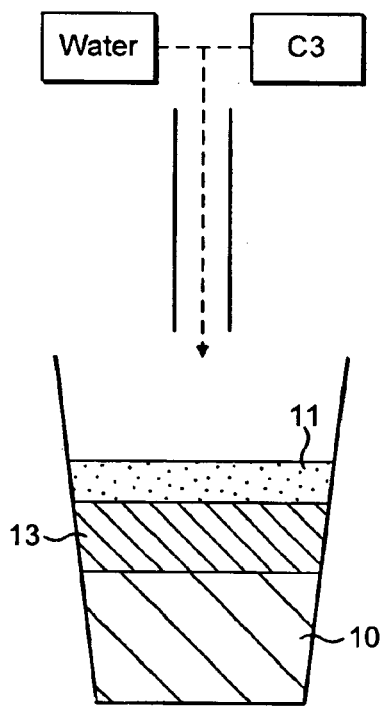
Figure 6:
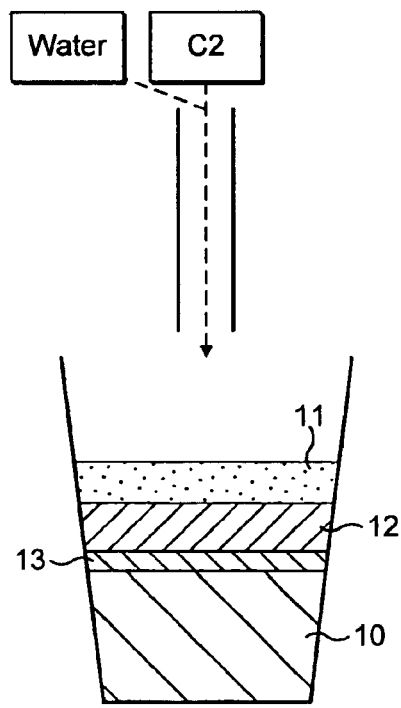

As further apparent in FIGS. 4 to 6, the method of the invention may encompass the delivery of more than two layers of liquids for the creation of a beverage with multiple contrasted layers. For that, it may further comprise pumping of a metered amount of third liquid concentrate and the mixing of said metered amount of liquid concentrate with water and the delivering of a third or intermediate liquid layer in the container; the density of the third layer being set higher than the density of the first layer but lower than the density of the second layer.

In a preferred example, a first liquid layer 10 of density d1, typically reconstituted liquid milk, is made from a first milk concentrate C1 and water. The density d1 is set by controlling the ratio of concentrate to water as aforementioned. Water and concentrate may be delivered during the same amount of time and simultaneously. More preferably, water is delivered continuously at a certain flow rate adjusted to not exceed a certain limit over which too much turbulence is created. For instance, water may be delivered at a flow rate of between 5 to 10 mL/s. Water could also be intermittently delivered. Preferably, a residual portion of the first concentrate is whipped with water to form a layer of foam 11 which is delivered on top of the first liquid layer. In the next step, a liquid layer 13, typically a sucrose layer coming from a sucrose concentrate C3 is delivered at a density d3, with d3 being controlled by proper water dilution to stay at a value lower than d1 but much higher than the density of the foam layer 11. Again, water can be maintained constantly at the flow rate of between 5 to 10 mL. The proper dilution ratio may be obtained by delivering a dose of third concentrate, e.g. liquid sucrose, such that when it dilutes with the water, a density lower than the density of the first layer is achieved.

The foam layer 11 serves to reduce the velocity of the diluted sucrose layer 13 which settles gently above the surface of the first layer. Finally, a liquid layer 12, typcically coffee, is discharged in the container, from the mixture of a coffee concentrate C2 and water, at a density d2. The density d2 is also controlled to be the lowest out of the three densities d1 to d3 of the liquid layers. The foam layer also serves to dampen the liquid layer 12 so that it hits the surface of the intermediate layer 13 with a reduced velocity. While the coffee concentrate C2 is delivered, water delivery is maintained at the set flow rate and until the proper-dilution flow ratio of the layer 12 has been achieved and so which can exceed the delivery time of the concentrate C2 itself.

The concentrates that can be used to create the layers are not limited but can be any numbers of food grade liquids such as milk and milk concentrates, coffee liquor, cocoa concentrate, sugar syrup such as fructose, glucose, sucrose, corn syrup or a mixture thereof, flavored liquids with colorants and/or flavors, plant liquid extracts such as tea concentrate, fruit juices and concentrates and/or mixture thereof The most preferred liquids are milk, coffee, cocoa and sucrose concentrates. Milk broadly refers here to any sort of dairy or non-dairy whitherning concentrates. Preference is given to dairy milk obtained from fresh or powdered milk.

It must be noted that a liquid layer may also be formed from more than one concentrate. For instance, coffee and sucrose concentrate can be combined to deliver a sweetened liquid coffee layer which appears distinctively from other layers in the container.

When working with fruit juices, which typically have similar density, added solutes play an important role, even greater than product flow rate and pausing time. Therefore, varying the density in the fruit juice is primarily obtained by addition of variable amounts of solutes such as sugar concentrates. By adjusting the pH to be above the isoelectric point of milk proteins, fruit concentrates can also be dispensed on top of a milk layer to avoid milk protein coagulation.

The "concentrate" typically refers to a relatively low density or specific gravity, high solid content, low water activity liquid product which can preferably be stored at ambient or eventually chilled temperature for an extended period of time. Concentrate in the present invention contains typically more than 10 wt. % solids by total weight, have a density of at least 1.05 g/mL.

Figure 7:
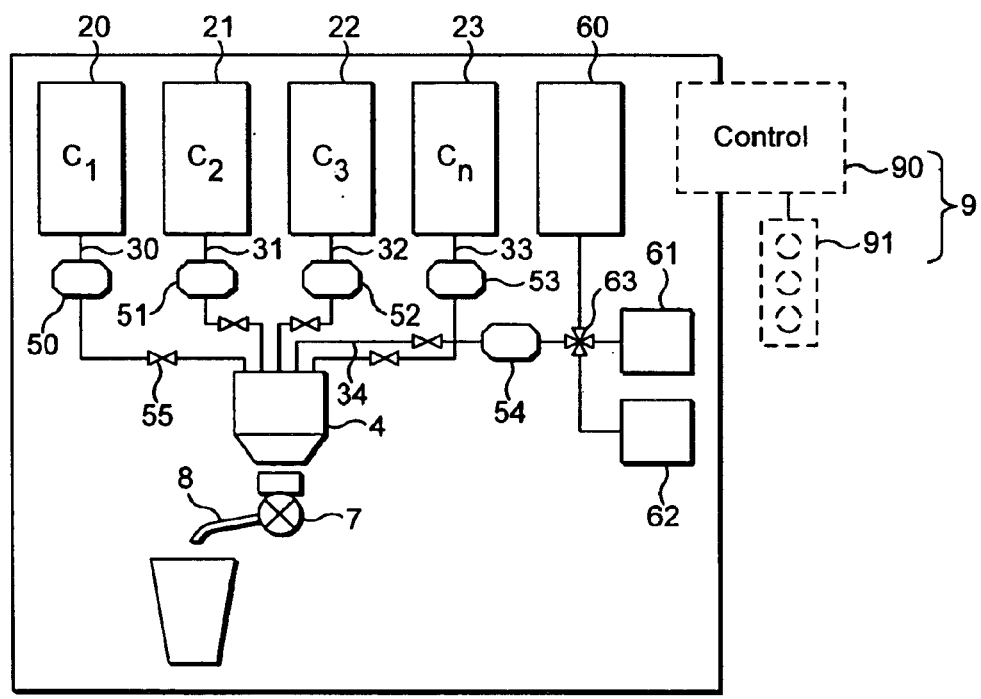
FIG. 7 is a general schematic illustration of the device of the invention.

Referring to FIG. 7, the preferred device 2 of the invention comprises a series of storage containers 20, 21, 22, 23 for storing liquid concentrates C1, C2, C3, Cn and concentrate lines 30, 31, 32, 33 connecting each storage container to a common mixing chamber 4. Each concentrate line connects to the bottom side of one particular storage container and is operatively engaged in a pump 50, 51, 52, 53 of the device whose function is to meter the concentrate in the mixing chamber. Preferably, volumetric positive displacement pumps, such as peristaltic pumps, should be used. Preferably, the concentrates are stored in removable containers such as bag-in-box type packages or pouches and the like.

The mixing chamber 4 is also in fluid communication with a water supply line 34 which communicates to the mixing chamber 4.

Water in the water supply line is transported and metered by a water pump 54, preferably although not necessary, of the same kind as the ones for the concentrates. Water may be supplied from one or more water reservoirs 60, 61, 62 or, alternatively from tap water. Water reservoir 60 may contain hot water, reservoir 61 may contain chilled water and reservoir 62 may contain just ambient water. Selective delivery of hot, chilled or ambient water from the reservoirs is carried out by a three way-valve 63 under the control of the controller. The hot water can be heated by a heating system (not shown) to a determined temperature range. Such heating system can be, for instance, a resistive heating element in the water reservoir itself 60 or an instant heating system mounted along the water supply line. The mixing chamber 4 prolongs itself by a whipping system 7 capable of foaming and thus generating foamed portions of the beverage. The whipping system may be of different kind such as a conical vane or disk. At the end of the dispensing line is found the discharge line with a nozzle 8. The nozzle may also comprise a pinch valve which restricts the flow of liquid passing there through and which is controlled by the controller. The pinch valve can thus regulate the flow linear velocity of the discharged liquids within the preferred ranges to form the successive layers. The pinch valve is not mandatory and the nozzle could be sized to deliver a low linear velocity at the required flow rates.

The device further comprises a control system 9. The control system will generally include a timer or other periodic energizing device. The control system also comprises a user input device 91 such as a switchboard. The control system is arranged in signal communication with the concentrate pumps 50–53, the water pump 54, the whipper 7, valves 55, 63 (and the others) and eventually the heater to control these different components on a simple on/off mode or, alternatively, on a proportional mode.

The concentrate lines 30–33 and water lines 34 are further sized to control the flow rates when the pumps are turned on. In particular, the internal diameter of the concentrate lines and water lines are differentially sized to control the concentrate and water flow rates according to the required concentrate density variation between the layers but without necessarily having to adjust the speed of the pumps. Therefore, DC or AC driven pumps can be utilized which are simply cycled on an on/off mode the controller to run at a constant speed during a certain period of time necessary to dilute with the concentrates or simply add water in the container. For instance, for milk concentrate, coffee concentrate and cocoa concentrate the lines are respectively sized at an internal diameter of between 3 to 12 mm.

Water and concentrate dosing could be provided by any means, however, peristaltic pump dosing is preferable for dosing of concentrates with a higher degree of hygiene since there is no contact between pump and the dosing media. Water could by also dosed by tap water pressure without pump.

The control system 9 has a programmable controller or processor 90 and user input means 91 in signal communication with the processor where the user is able to make selections of various beverages with various different multi-layered characteristics. The programmable processor may include a machine-readable program, such as softwares resident in the processor. The machine readable program contains instructions for controlling the dosing settings for delivering a variety of multi-layered beverages and which typically include the pump and whipper settings, e.g., specific timing sequences for pumps' activations, pumps' speed to determine flow rates of the water and concentrates and linear velocity, whipper speed, water temperature, and other variables.

The assembly of components, controls, timing and programing do not need to be further described herein since they are of typically known technology in the domain of beverage dispensing.

FIGS. 1, 2 and 7 refer to the first exemplary embodiment for automatically delivering a visually attractive foamed multi-layered beverage with two liquid layers. An input signal is entered by the user via the user input means 91, e.g., a touch screen, a switchboard or equivalent. The user input means transmits the relevant signal to the programmable controller 90 regarding the chosen beverage selection from a plurality of beverage selections. In response to this signal and in accordance with the identified programmed settings, the controller 90 activates a first concentrate pump, e.g., the milk pump 50, and the water pump 54 simultaneously to meter respectively the milk concentrate C1 and water in the mixing chamber 4. The concentrate and water flow rates are respectively determined by the programmed selection to deliver in the container a first layer of liquid from the first concentrate, e.g., a layer of reconstituted liquid milk. During dispensing of the liquid layer, the whipper is not activated by the controller to avoid making unnecessary turbulence in the layer of liquid.

The liquid layer delivery is followed by the delivery of a small foam layer. For this, before the first liquid concentrate pump 50 is turned off by the controller, the whipper 7 is activated by the controller to whip a residual portion of the concentrate with water continuing flowing in the mixing chamber. The speed of the whipper is set at the desired speed which is programmed for the desired selection. For foaming milk, the optimum whipper speed is preferably of between 10,000 to 20,000 rpm. The foam layer is thus delivered onto the first liquid layer as shown in FIG. 1. It can be noted that the layer of foam 11 could be made from any concentrate of the device but preference is given to make it from the same concentrate C1 which serves to produce the first layer of liquid 10, e.g., reconstituted milk. The dilution ratio of concentrate C1 to water for the foam layer, when the whipper is on, is set comparatively lower than the dilution ratio of concentrate C1 to water for the first liquid layer. In other words, the amount of concentrate is preferably a small amount, e.g., about 5 to 5.5 mL/s during 5 to 10 seconds, mixed with a large quantity of water, e.g., 7–8 mL/s during 15 to 20 seconds while whipping is maintained at high speed.

In the next step, the controller activates the second concentrate pump, e.g., the coffee pump 51, while the water pump 54 remains activated to mix with the second concentrate C2. The whipper may still be maintained running or, alternatively, be deactivated to reduce turbulence.

Additional improvements may be provided to the method and device of the invention. For instance, distance between the nozzle and beverage container should be within a specific range to avoid splashing and creating more turbulence. The distance and the diameter of the container determine the angle between the nozzle and the rim of the container. This angle may preferably vary from 10 to 120 degrees, preferably from 20 to 60 degrees, and most preferably from 25 to 35 degrees.

EXAMPLES

In the following examples, milk concentrate contains about 28 wt. % total solids and has density of 1.07 g/cm$^3$, coffee concentrate bout 55 wt. % total solids and 1.25 g/cm$^3$, cocoa concentrate about 72 wt. % and 1.35 g/cm$^3$ and finally sucrose solution (50 wt %) has density of 1.23 g/cm$^3$.

Example 1

A Cappuccino type beverage was prepared using the dispensing device of FIG. 7 from milk and coffee concentrates. A Cappuccino with two distinct layers was prepared using the following procedure. Temperature of water used was 85° C., and the concentrates were dispensed at ambient temperature (15–25° C.). The flow velocity of ingredients was 60 cm/s as measured from the nozzle.

Figure 11:
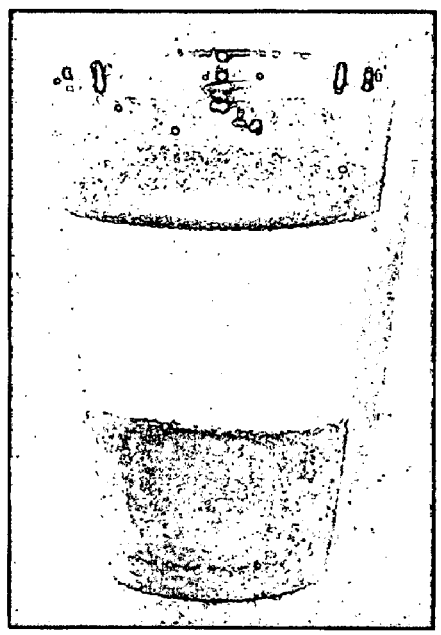
FIGS. 11 to 16 are photographs of multi-layered beverages as obtained by the method of the invention and corresponding, respectively, to Examples 1 to 6.

Milk concentrate, at flow rate of 5.3 mL/s, for 10 sec, was first dispensed simultaneously with water at a flow rate of 6.9 mL/s. The whipper was turned on at the end of the cycle to create foam. This step was followed by dispensing water and residual milk remaining in the tubing, thus creating a layer at 70° C. Coffee concentrate, at flow rate of 2 mL/s, was dispensed lastly with water at same flow rate as for the first concentrate (6.9 mL/s but for 2 sec). Differences in density and temperature between the milk (1.024 g/cm$^3$ at 55° C.) and coffee (0.996 g/cm$^3$ at 77° C.) layers allowed them to remain separated and form visually distinct layers (see FIG. 11). The product delivery flow rate was 7.5 mL/s. Further, the layers were very stable in time.

Example 2

A Cappuccino type beverage was prepared using a dispenser as in Example 1 from milk, coffee and sugar (50% wt) concentrates.

Milk was dispensed as in Example 1, followed by sucrose syrup at a flow rate of 3.8 nL/s, dispensed after 11 sec for 5 sec, and water and finally coffee concentrate mixed with water. The water and sucrose concentrate formed a density variation (1.024 (milk layer)>1.019 (sugar layer)>0.981 (coffee)) which allowed the coffee to partially distribute in multiple layers. The delivery rate was 7.5 mL/s.

Figure 12:
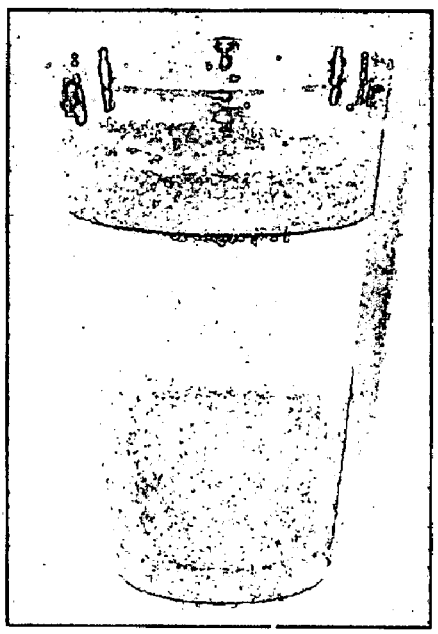

Adding sugar to the formulation, helped to sweeten the product, and additionally enhanced layering in the beverage (FIG. 12).

Example 3

A Cappuccino type beverage was prepared as in Example 1. The whipper was turned on immediately (no initial delay).

Figure 13:
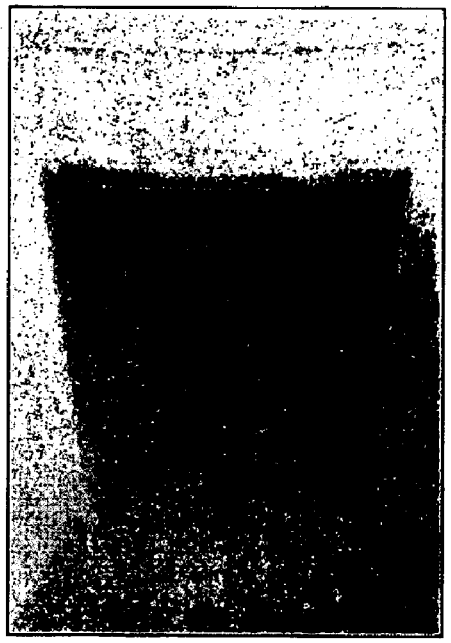

The milk layer at the bottom of the cup was significantly thinner than in Example 1. Having the whipper in on-mode created more turbulence and decreased (by incorporating more air) the density gradient between the milk and coffee fractions (FIG. 13).

Example 4

A Cappuccino type beverage was prepared as in Example 1. The coffee fraction (coffee and water) was dispensed at low flow rate of 1.2 mL/s. The dispensing time was of about 32 s for 250 mL beverage.

Figure 14:
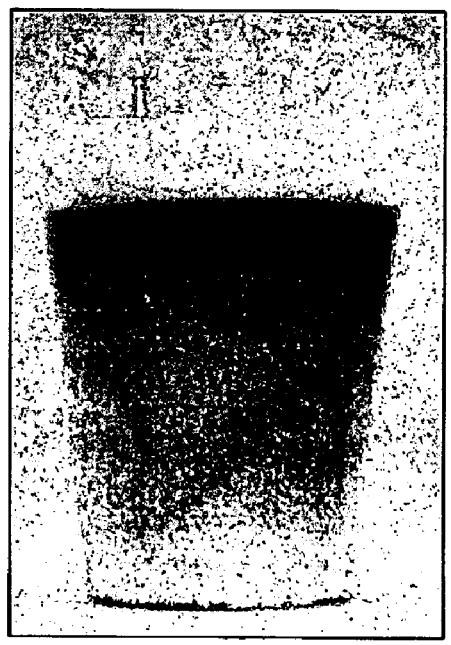

A sharp and narrow coffee layer was created (FIG. 14).

Example 5

A Cappuccino type beverage was prepared as in Example 1. Temperature of water and liquid concentrates was ambient (about 23° C.).

Figure 15:
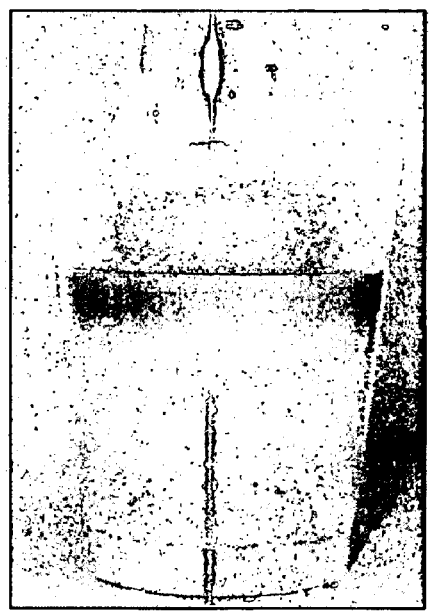

A layered beverage was obtained (FIG. 15)

Example 6

Cappuccino type beverage was prepared as in Example 1. However, milk and coffee were cycled two times successively.

A multi-layered beverage was obtained.

Example 7

Figure 8:
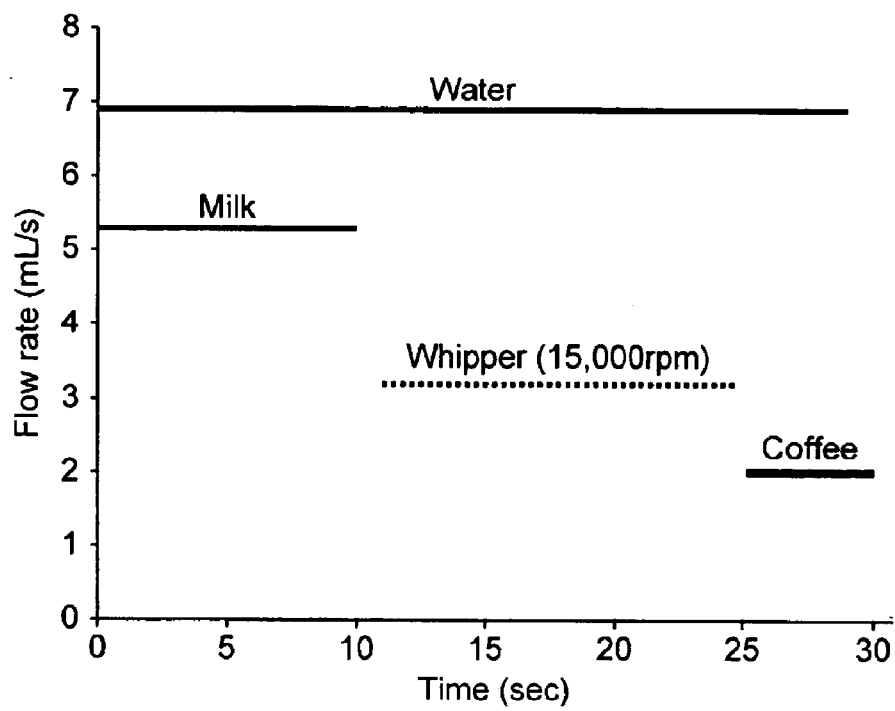
FIGS. 8, 9 and 10 are examples of dosage settings corresponding respectively to examples 7, 8 and 10.

Cappuccino type beverage was prepared as in Example 1. However, the whipper was turned off before dispensing coffee (after 25 sec, FIG. 8).

Layered Cappuccino was dispensed with lower amount of foam.

A sharp multi-layered beverage was obtained.

Example 8

Figure 9:
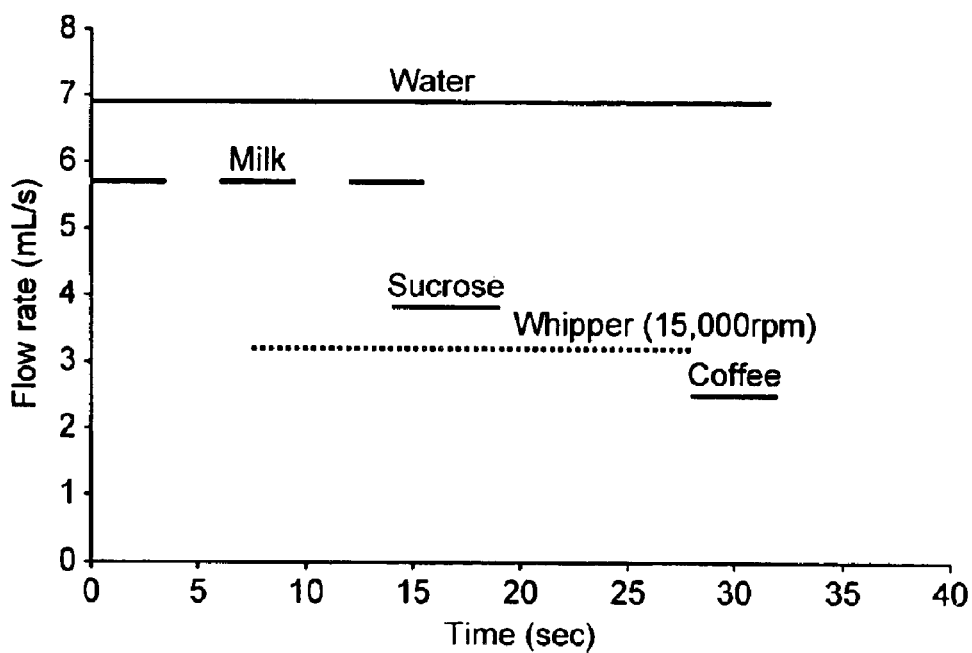

Cappuccino type beverage was prepared as in Example 2. However, milk was pumped for the same amount of time (10 sec) but cycled three times successively as shown in FIG. 9.

A sharp and narrow coffee layer was created.

Example 9

Cappuccino type beverage was prepared as in Example 1. Temperature of water used was 4° C. and of liquid concentrates was ambient (about 23° C.).

Layered Cappuccino was dispensed.

Example 10

Figure 10:
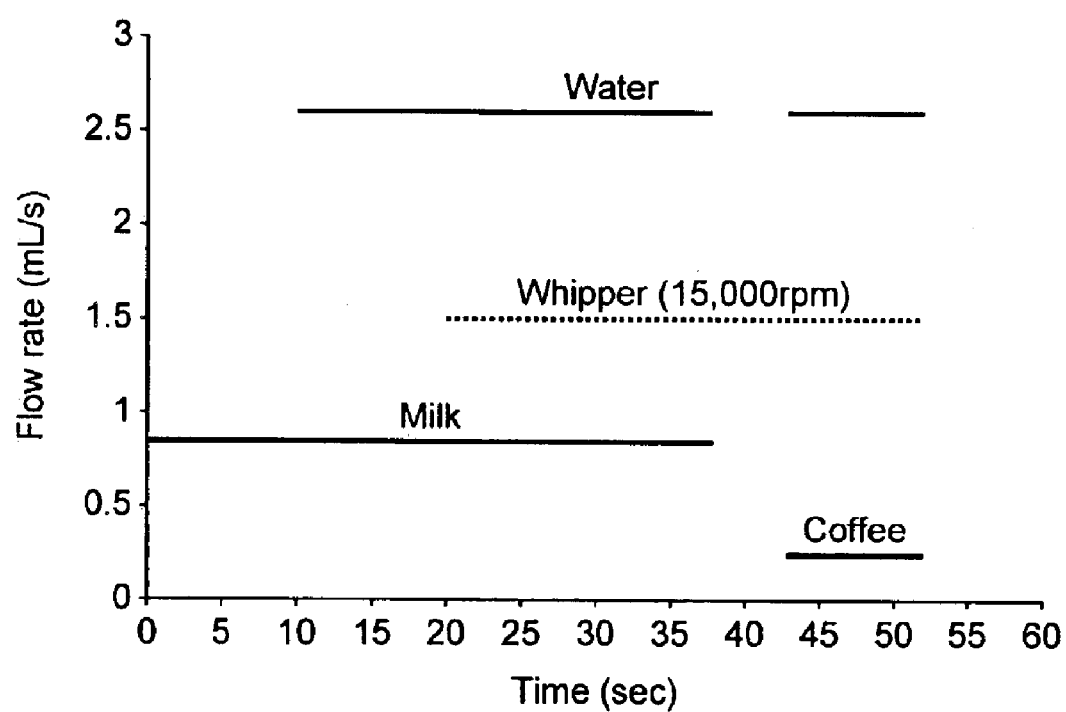

Cappuccino type beverage was prepared under the following conditions: milk was dispensed from 0 to 38 seconds (with a flow rate of 0.84 mL/s), coffee from 43 to 52 seconds (at flow rate of 0.24 mL/s) and water from 10 to 38 and from 43 to 52 seconds at flow rate of 2.6 mL/s. Dosage settings are shown in FIG. 10.

A coffee layer was created on top of milk.

Example 11

Chocolate beverage was prepared under conditions provided by Example 5 with water and milk and chocolate concentrate (chocolate concentrate replacing coffee concentrate). The chocolate concentrate had flow rate of 0.22 mL/s and was dispensed from 46 to 52 sec. The whipper was in off-mode.

A chocolate layer was created on top of milk.

Example 12

Milk, chocolate and coffee were dispensed at flow rates of 0.84 mL/s, 0.22 mL/s and 0.24 mL/s and mixed with water at flow rate of 2.6 mL/s.

A multiple layered beverage was dispensed.

Example 13

Figure 16:
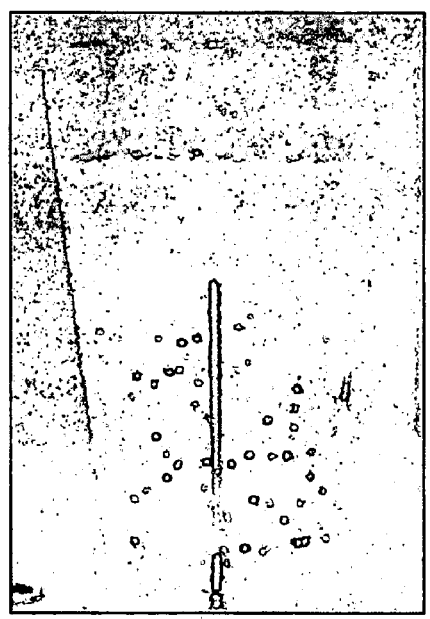

Fruit juice #1 (green punch) was dispensed at flow rate of 0.9 mL/s (for 30 sec) with 5% sucrose 0 solution (for 20 sec) and fruit juice #2 (ruby red grapefruit juice) of 0.3 mL/s (for 15 sec). The average density of the fruit juices was 1.06 g/cm$^3$ (FIG. 16).

Distinct layers between the fruit juices were generated by increasing the density of juice#1.

Example 14

Cappuccino type beverage was prepared as in Example 1. However, the flow rate of water was greater than 20 mL/s.

A well-mixed Cappuccino was obtained. No layers were created in the cup.

Example 15

Cappuccino type beverage was prepared as in Example 1. However, the flow velocity of water was greater than 120 cm/s.

A well-mixed Cappuccino was obtained. No layers were created in the beverage.

Example 16

A Cappuccino type beverage was prepared using a dispenser as in Example 1 from milk and coffee concentrates.

Water was dispensed from time $t_0$=0 to time 30 sec ($t_0$ being the starting time at 0 second), milk was dispensed from time 0 to time 10 sec (i.e., from $t_0$ to $t_0$+10 seconds), and finally coffee concentrate from time 26 to time 30 sec. (i.e., from $t_0$+26 to $t_0$+30 sec.) Whipper was on from time 10 to time 26 sec (i.e., from $t_0$+10 to $t_0$+26 sec.). Total delivery time for layered beverage was 32 sec.

Visually distinct layers were formed and the layers were very stable in time.

Example 17

A Cappuccino type beverage was prepared using a dispenser as in Example 1 from milk and coffee concentrates.

Water was dispensed from time 0 to 28 sec (i.e., from $t_0$ to $t_0$+28 sec.), milk was dispensed from time 0 to 10 sec (i.e., $t_0$ to $t_0$+10 sec.), and finally coffee concentrate from 22 to 28 sec. (i.e., from $t_0$+22 to $t_0$+28 sec.) Whipper was on from 11 to 20 sec. (i.e., from $t_0$+11 to $t_0$+20 sec.). Total delivery time for the layered beverage was 30 sec.

Visually distinct layers were formed and the layers were very stable in time.

Example 18

A Cappuccino type beverage was prepared using a dispenser as in Example 16 from milk and coffee concentrates, but with whipper on from 5 to 26 sec.

A greater amount of foam was generated as compared to that in Example 16, and visually distinct layers were formed. Further, the layers were very stable in time.

Example 19

A Cappuccino type beverage was prepared using a dispenser as in Example 16 from milk and coffee concentrates, but with whipper on from 0 to 26 sec.

A greater amount of foam was generated as compared to that in Examples 16 and 18, and visually distinct layers were formed. Further, the layers were very stable in time.

Example 20

A Cappuccino type beverage was prepared using a dispenser as in Example 16 from milk and coffee concentrates, but with whipper on from 0 to 10 sec.

A Lesser amount of foam was generated as compared to that in Example 16, and visually distinct layers were formed. Further, the layers were very stable in time.

Example 21

A Cappuccino type beverage was prepared using a dispenser as in Example 16 from milk and coffee concentrates, but with whipper on from 12 to 20 sec.

Very low amount of foam was generated as compared to that in Examples 16 and 18, and visually distinct layers were formed. Further, the layers were very stable in time.

According to the findings, the amount of the foam could be customized depending on customer preferences. The same applies to liquid layer color and volumes.

The examples have shown that in order to generate beverages with stable layers, it was found important to respect: a) a layer density gradient by proper dilutions of concentrates, b) liquid layer motions by establishing specific liquid flow linear velocities and the dispensing procedure, i.e. delays, pausing time, overlapping, etc. and c) predetermined flow rates.

Further, for hot beverages, a temperature gradient is also desirable to reduce turbulence and have a density gradient, and so to stabilize the layers. Thus, to minimize liquid motion to create distinct liquid layers, flow linear velocity (low linear velocity for required high flow rates), pausing time between layers (to minimize liquid motion to prevent mixing of layers due to diffusion, convection, etc.), and creation of foam between first and subsequent liquid layers (to further decrease next liquid linear velocity) were also found to play an important role.

What is claimed is:

1. A method for dispensing a beverage with two or more superimposed liquid layers in a container, which comprises:
   providing at least one source of first liquid concentrate and at least one source of second liquid concentrate;
   pumping a metered amount of the first liquid concentrate from the source and delivering it into a container to provide a first liquid layer therein;
   pumping a metered amount of the second liquid concentrate from the source, mixing it with a metered amount of water to form a second, diluted liquid layer from the second concentrate, and delivering the diluted second concentrate into the container and first liquid layer to form a second liquid layer;
   wherein the second liquid layer is diluted to a density that is lower than that of the first liquid layer so that the first and second layers form a stable layered arrangement in the container with the second, diluted liquid layer of lower density remaining spatially above the first liquid layer to provide a beverage having a visually distinct upper layer upon a lower layer in the container.

2. The method according to claim 1, wherein the first liquid layer is obtained by mixing the metered amount of first liquid concentrate with a metered amount of water and wherein the density variation between the first and second liquid layers is set by controlling the concentrate-to-water dilution ratio of the first liquid layer with respect to the concentrate-to-water dilution ratio of the second liquid layer.

3. The method according to claim 2, wherein the density variation between the first and second liquid layers in the container is controlled to be equal to or higher than 0.1%.

4. The method according to claim 3, wherein the density variation between the first and second liquid layers in the container is controlled to be comprised between 0.1 and 40%.

5. The method according to claim 1, wherein the first and second liquid layers are delivered in a gentle manner without causing significant turbulence in the container.

6. The method according to claim 5, wherein the metered amounts of dilution water provide flow rates to dilute and mix respectively with the amounts of first and second concentrates are each set to not exceed 20 mL/s for a container size of between 50 and 500 ml.

7. The method according to claim 6, wherein the water flow rates are between 5 and 10 mL/s.

8. The method according to claim 5, wherein the dilution water to dilute and mix respectively with the amounts of first and second concentrates are each set to have a flow linear velocity that does not exceed 120 cm/s.

9. The method according to claim 8, wherein the flow linear velocity is between 30 and 100 cm/s.

10. The method according to claim 1, wherein a pause is provided between the pumping of the first concentrate and the pumping of the second concentrate.

11. The method according to claim 1, wherein
   during or after delivering the first liquid layer, a metered portion of concentrate is mixed with water and further whipped to deliver foam directly onto the first liquid layer so as to slow down the delivery of the second liquid layer to the container.

12. The method according to claim 2, wherein the concentrate and dilution water for the first and second liquid layers form concentrate-to-water dilution ratios that are adjusted relative to each other to provide a temperature difference between the first and second layers in the container of at least 5% with the second layer having a higher temperature than the first layer.

13. The method according to claim 1, wherein the first and second concentrates have different visual and taste attributes.

14. The method according to claim 1, wherein the first and second concentrates have a different intrinsic density and different initial solids contents.

15. The method according to claim 14, wherein the first liquid concentrate is a milk based concentrate having between 15 to 33 wt. % total solids and a specific gravity of between 1.01 to 1.15 g/mL.

16. The method according to claim 14, wherein the second liquid concentrate is a coffee based concentrate having between 45 to 60 wt. % total solids and a specific gravity between 1.05 to 1.28 g/mL.

17. The method according to claim 16, wherein the amount of milk concentrate to water is present at a ratio that does not exceed 1:3 and the amount of coffee concentrate to water is is present at a ratio that is equal to or higher than 1:5.

18. The method according to claim 1, which further comprises pumping a metered amount of a third liquid concentrate from a source, mixing the metered amount of liquid concentrate with water, and delivering a third diluted liquid layer into the container, wherein the density of the third layer is set lower than the density of the first layer but higher than the density of the second layer.

19. The method according to claim 18, wherein the mixing and delivery of the diluted third concentrate is controlled to at least partially overlap with the delivery of the diluted first and/or second concentrates.

20. The method according to claim 18, wherein the delivery of the third concentrate is controlled to follow the delivery of the first layer from the first concentrate but to precede the delivery of the diluted second concentrate.

21. The method according to claim 1, wherein the third concentrate is a liquid sweetener.

22. The method according to claim 1, wherein the at least first and second concentrates are selected from the group consisting of coffee, milk, cocoa, sugar, micronutrients, fruits, plant extracts and combinations thereof.

* * * * *